United States Patent [19]

Juy, deceased

[11] 4,156,373

[45] May 29, 1979

[54] CABLE GUIDE APPARATUS HAVING A METAL TUNNEL MEMBER WITH AN ANTI-FRICTION COVER MEMBER REMOVABLY MOUNTED THEREIN

[75] Inventor: Lucien C. H. Juy, deceased, late of Dijon, France, by Henri Juy, heir

[73] Assignee: Le Simplex, Dijon, France

[21] Appl. No.: 817,117

[22] Filed: Jul. 18, 1977

[30] Foreign Application Priority Data

Jul. 20, 1976 [FR] France .................. 76 23083

[51] Int. Cl.² .................. G01P 3/20; G01F 3/24
[52] U.S. Cl. .................. 74/501 R; 74/217 B
[58] Field of Search .......... 280/289 R, 289 G, 289 H; 188/24; 74/501 R, 501 M, 501.5 R, 611, 511 R, 501 P, 217 B

[56] References Cited

U.S. PATENT DOCUMENTS

| 2,890,041 | 6/1959 | Runton et al. .................. 308/238 X |
| 3,008,343 | 11/1961 | Wasley .................. 74/501 |
| 3,143,001 | 8/1964 | Chisholm, Jr. et al. .................. 74/501 |
| 3,380,843 | 4/1968 | Davis .................. 308/238 |
| 3,464,882 | 9/1969 | Morton .................. 308/238 X |
| 3,830,115 | 8/1974 | Juy .................. 74/501 R |
| 3,995,512 | 12/1976 | Johnsen .................. 74/501 R |

FOREIGN PATENT DOCUMENTS

| 98348 | 6/1924 | Austria .................. 403/206 |
| 398781 | 1/1909 | France .................. 188/24 |
| 476391 | 7/1915 | France .................. 188/24 |
| 871431 | 4/1942 | France .................. 74/501 |
| 277541 | 9/1930 | Italy .................. 188/24 |
| 3328 of | 1900 | United Kingdom .................. 188/24 |
| 6267 of | 1903 | United Kingdom .................. 188/24 |
| 529938 | 12/1940 | United Kingdom .................. 74/501 |

*Primary Examiner*—Leslie Braun
*Attorney, Agent, or Firm*—Haseltine, Lake & Waters

[57] ABSTRACT

Cable guide apparatus for a bicycle or similar vehicle comprising a metallic tunnel member with an anti-friction cover member removably secured therein. The metallic tunnel member can be welded or brazed to the frame of the bicycle and the anti-friction cover member is engaged in the tunnel member after the welding or brazing. The anti-friction cover member has an opening for slidably receiving a control cable. The tunnel member is curved and internally receives the cover member along the length at which the cable bears. The cover member has a low coefficient of friction and preferably is a synthetic resin material. The tunnel member and the cover member have complementary locking elements for securing the cover member in the tunnel member in removable manner.

4 Claims, 15 Drawing Figures

U.S. Patent  May 29, 1979  Sheet 1 of 2  4,156,373
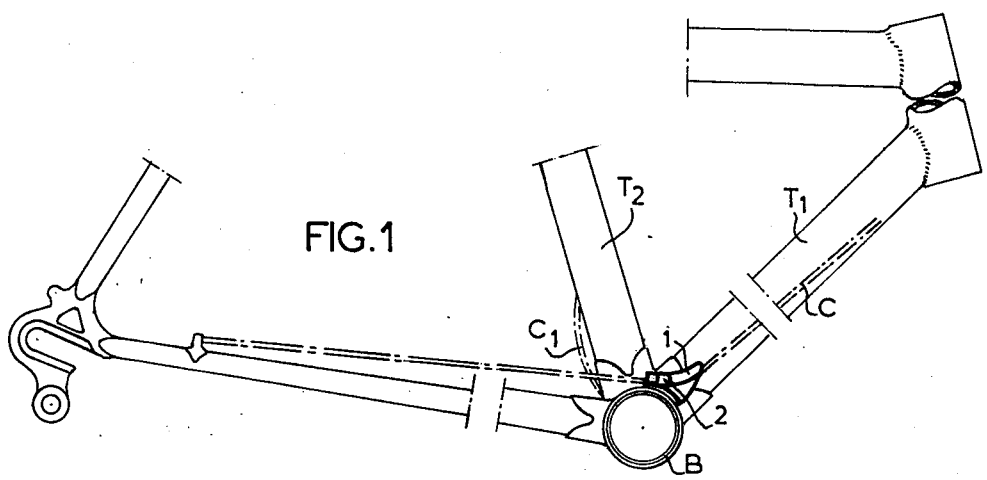
FIG. 1
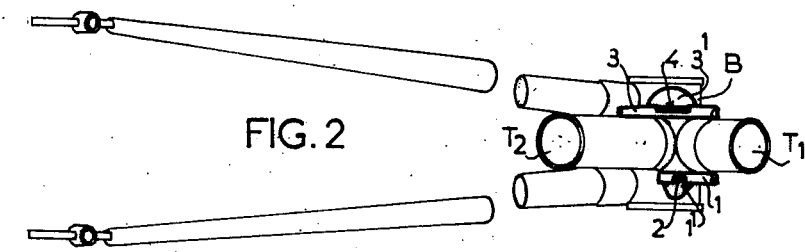
FIG. 2
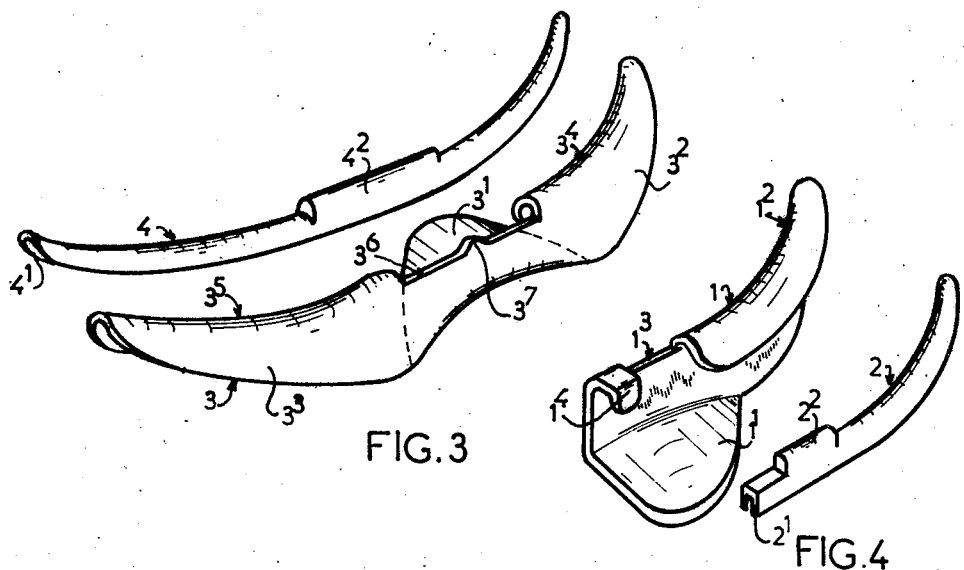
FIG. 3
FIG. 4

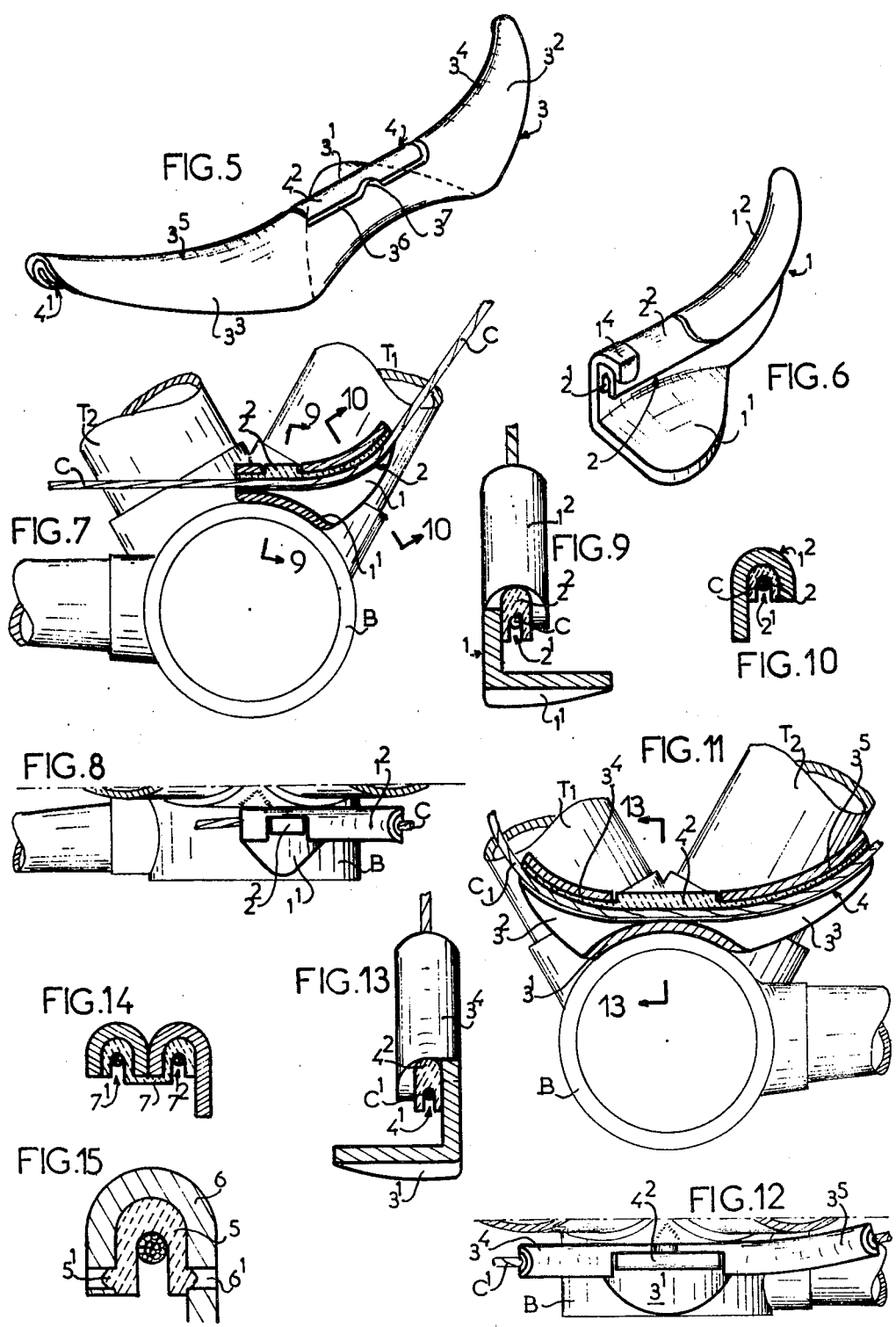

CABLE GUIDE APPARATUS HAVING A METAL TUNNEL MEMBER WITH AN ANTI-FRICTION COVER MEMBER REMOVABLY MOUNTED THEREIN

FIELD OF THE INVENTION

The invention relates to cable guide apparatus comprising a metal tunnel member with an anti-friction covering, said metal tunnel member being adapted to be welded or brazed to the frame of a bicycle or similar vehicle.

BACKGROUND

On bicycles and similar vehicles, the control of the change of speed at the crank gear or at the rear wheel is conventionally effected by means of a cable which is pulled or released by means of a lever or other control member. In its travel, the cable tends to generally follow a tube of the frame. In proximity to the casing of the crank gear, the bare cable changes direction and for this purpose it is guided and directed by means of a cable guide tunnel.

In a manner which is simple, robust and not subject to breakdown, the cable guide tunnels are made of cut sheet steel and suitably formed and they are currently welded to the tube of the frame or to the casing of the crank gear. According to another embodiment, the cable guide tunnel can be solid with collars which can be removably affixed to the tube or casing.

Repeated friction of the steel cable in the metallic tunnel produces premature wear of the cable, its oxidation and jamming. The controls become hard to operate and prove difficult for the cyclist.

When the guide cable tunnel is welded to the frame, these disadvantages can not be avoided by forming a coating, by molding or encasing on the surface of the tunnel a product or material having a low coefficient to friction, since at the time of the welding or brazing this coating will become destroyed.

SUMMARY OF THE INVENTION

An object of the invention is to provide a cable guide apparatus which avoids the above disadvantages. According to the invention, the cable guide apparatus includes a tunnel member with a curved portion and the apparatus is characterized in that the tunnel member internally receives at least over that part of its length against which the cable bears, a removable cover member of a material having a low coefficient of friction, said cover member being applied after the welding or the brazing of the tunnel member, said tunnel member and said cover member having complementary means for maintaining and positioning the cover member in the tunnel in removable manner.

According to one feature of the invention, the anti-friction cover member is composed of a rigid material having good resistance to abrasion, said material having sufficient elasticity to be maintained in the curved portion of the tunnel in a vertical direction by pressure exerted by the stressed cable and in the longitudinal direction by one or more claws or projections cooperating with partial openings or slots in the tunnel and/or the extremities of the tunnel.

BRIEF DESCRIPTION OF THE DRAWINGS

FIG. 1 is a schematic elevational view showing a portion of a frame of a bicycle equipped with the apparatus according to the invention.

FIG. 2 is a top plan view of the apparatus in FIG. 1.

FIG. 3 is a perspective view showing a guide apparatus for the cable for controlling change of speed at the crank gear, an anti-friction member being shown at the side of a guide cable tunnel member prior to its engagement in the tunnel member.

FIG. 4 is a perspective view showing a guide apparatus for the cable for controlling change of speed at the rear wheel, an anti-friction member being shown at the side of a guide cable tunnel member prior to its engagement in the tunnel member.

FIG. 5 is a perspective view similar to FIG. 3 showing the anti-friction member engaged and positioned in the tunnel member.

FIG. 6 is a perspective view similar to that of FIG. 4 showing the anti-friction member engaged and positioned in the tunnel member.

FIG. 7 is a side view in longitudinal section of the cable guide apparatus illustrated in FIGS. 4 and 6 for the change in direction of the control cable for speed change at the rear wheel; the apparatus being illustrated as fixed on the right side of the casing for the crank gear of the bicycle.

FIG. 8 is a partial view from above the apparatus illustrated in FIG. 7.

FIG. 9 is a sectional view on greater scale taken along line 9—9 in FIG. 7.

FIG. 10 is a sectional view on greater scale taken along line 10—10 in FIG. 7.

FIG. 11 is an elevational view in longitudinal section of the guide cable apparatus illustrated in FIGS. 3 and 5 effecting change of direction of the cable for speed change at the crank gear; this apparatus being illustrated as fixed on the left side of the casing for the crank gear of the bicycle.

FIG. 12 is a partial view from above of the apparatus illustrated in FIG. 11.

FIG. 13 is a sectional view on greater scale taken along line 13—13 in FIG. 11.

FIG. 14 is a view on greater scale in transverse section of a variant of the embodiment of the anti-friction member, this member straddling a dual metallic tunnel member having two grooves for guiding two cables disposed parallel to one another.

FIG. 15 is a view on still greater scale in transverse section of a cable guide apparatus illustrating another embodiment for fixing and positioning the cover member in the tunnel member.

DETAILED DESCRIPTION

In order to make more concrete the object of the invention, it will now be described in non-limiting manner with reference to the embodiments illustrated by way of example in the figures of the drawings.

As shown particularly in FIGS. 4,6,7,8,9 and 10 the guide apparatus for change of direction of the control cable for change of speed at the rear wheel is composed of a tunnel member 1 formed in known manner of cut sheet metal which is suitably shaped and bent. This tunnel member 1 has a perpendicularly bent foot 1' suitably contoured and adapted to be fixed by brazing or electric welding on the right side of tubing B for the crank gear shaft of the bicycle (FIGS. 1,2,7 and 8). A curved upper edge $1^2$ is connected above the foot $1'$ and forms the tunnel itself. This bent portion $1^2$ has a judiciously selected radius of curvature and extends in the direction of oblique tube $T_1$ of the frame to correctly direct the cable C coming from manipulation members fixed on the tube $T_1$ (FIG. 7).

According to the invention a cover member 2 is engaged in the tunnel formed by the bent portion $1^2$ and member 2 has a groove $2'$ at it's lower edge extending over its entire length for the guiding and the positioning of the cable C. The cover member 2 is made of rigid material having good resistance to abrasion and sufficient elastic capacity to permit its engagement in the portion $1^2$ after attachment of the tunnel on the tubing B for the crank gear shaft. The term "rigid" is meant to refer to a body which is self-supporting in shape, and the elastic capacity of such body refers to its ability to deform to become engaged in the tunnel member. Preferably, the anti-friction cover member is made of an acetyl resin such as Delrin.

The cover member 2 is maintained in the tunnel in the vertical direction by the pressure exerted by the stressed cable C, and in the longitudinal direction by a claw or projection $2^2$ formed at a rectilinear or substantially rectilinear upper portion of the cover member close to its extremity. The claw $2^2$ is engaged and retained in a partial opening $1^3$ or slot formed in a rectilinear or substantially rectilinear zone of the portion $1^2$ forming the tunnel, substantially right above the contoured foot $1'$. For the attachment by welding or brazing, the tongue $1^4$ formed between the extremity of the tunnel and the opening or slot $1^3$ is positioned approximately along the angle bisector formed between the oblique tube $T_1$ and the tube $T^2$ for the seat of the frame.

After welding of the tunnel, it is sufficient to engage the rectilinear or substantially rectilinear portion of the cover member 2 under the tongue $1^4$ and to pivot the anti-friction cover member to engage it in the curved portion $1^2$ of the tunnel.

Thus, it is seen that the cable C no longer has any risk of wear nor of abrasion due to its contact with the cover member and thereby the cable has increased longevity. Additionally, the sliding conditions are very favorably improved and thus all necessity of lubrication is eliminated.

According to another embodiment illustrated more particularly in FIGS. 3,5,11,12 and 13, the cable guide apparatus is adapted for the change of direction of the cable $C_1$ for control of speed change at the crank gear.

As before, this apparatus comprises a tunnel member 3 formed in known manner of cut sheet material suitably shaped. The tunnel member 3 has substantially in its median portion a bent foot $3'$ suitably contoured and adapted to be fixed by electrical welding or brazing at the left side of the tube B for the crank gear shaft.

From opposite sides of the foot $3'$ extend two portions $3^2$ and $3^3$ whose upper edges $3^4$ and $3^5$ respectively are curved and bent from the side of the foot $3'$ to form the tunnel itself. The curvature of the bent portions $3^4$ and $3^5$ is such that after attachment of the tunnel member, the portion $3^4$ extends substantially along the oblique tube $T_1$ and the portion $3^5$ extends approximately along the tube $T^2$ of the seat in order to change the direction of cable $C_1$ coming from the control member fixed on the tube $T_1$ and going to the derailleur of the crank gear fixed to the tube $T_2$.

A rigid cover member 4 having good resistance to abrasion and sufficient elastic capability, formed, for example, of acetyl resin such as Delrin is engaged in the bent portions $3^4$ and $3^5$ and effects the protection of the cable $C_1$ at the time of the displacement.

This anti-friction cover member has a groove $4^1$ at its lower longitudinal edge extending along its entire length for housing the cable $C_1$. The member 4 is maintained in the tunnel formed by the portions $3^4$, $3^5$ in the vertical direction by the pressure exerted by the stressed cable and in the longitudinal direction by a claw or projection $4^2$ formed on a median rectilinear or substantially rectilinear portion of the cover member 4. The claw $4^2$ is engaged in a partial opening or slot $3^6$ formed in the tunnel member substantially above the foot $3'$.

At the time of attachment by welding or brazing of the tunnel 3, the foot $3'$ is positioned substantially along the angle bisector formed between the tube $T_1$ and $T_2$. In a preferred manner which is non-limiting, this position can be facilitated by a marking boss $3^7$ or other index.

After attachment of the tunnel member on the tube B for the crank gear shaft, it is sufficient to engage one of the extremities of the cover member 4 in the corresponding bent portion $3^4$ or $3^5$ up to the position of the claw $4^2$ in registry with the slot $3^6$ and to elastically deform the cover member by manual pressure on the other extremity for its engagement in the corresponding bent portion.

As seen more precisely in FIG. 12, the rear portion $3^5$ of the apparatus is slightly bent towards the interior. This operation is necessary after brazing or welding to obtain the best orientation possible for the control cable $C_1$ which therefore passes behind the tube $T_2$ of the seat without friction against this tube. The bending can be slightly varied along the frames and following the front derailleur, the manufacturer determining therefore the suitable value to be given.

According to a variation of the embodiment illustrated in FIG. 15, the cover member 5 is maintained in position in the tunnel 6 by clips formed by fingers or bosses $5'$ formed on lateral arms of the cover member and cooperating with perforations $6'$ provided in the flanges of the tunnel member 6.

According to another embodiment, which is not illustrated in the figures of the drawings, the position and the support in the longitudinal direction of the cover member can be effected by claws formed at the extremities of the cover member and cooperating with the extremities of the tunnel member. This arrangement can be combined with that described above, i.e. in the case where there is a single projection engaged in a partial opening or slot.

It is obvious that the two embodiments defined hereinabove can be applied both for left and right guide cables.

Illustrated in FIG. 14 is a variation of the embodiment of the anti-friction cover member. This cover member 7 has two grooves $7^1$ and $7^2$ and straddles a dual tunnel member. This disposition is particularly advantageous in the case of a control by front and rear derailleurs effected only from the right side by means of a handle comprising two superposed levers.

It is obvious that the apparatus can be applied to a one-piece tunnel member and collar which can engage around tube B as well as to a tunnel connected to a separate collar.

The advantages follow clearly from the description and in particular the following are noted:

absence of wear, corrosion and oxidation of the cables; great ease in operation due to the conditions of very favorable sliding;

absence of the necessity of lubrication of the cable at the level of the friction in the cover member; and longevity of the cable and improved reliability of the control.

The invention is not only limited to those of its modes of application nor to those of its embodiments and various portions which have been specially disclosed. In contrast, it embraces all variations covered by the appended claims:

What is claimed is:

1. Guide apparatus for a cable under stress, comprising a metallic tunnel member including substantially perpendicularly bent foot means for affixing the tunnel member to the frame of a bicycle, and an anti-friction cover member engaged within said tunnel member, said anti-friction cover member having an opening for receiving the cable, said tunnel member and cover member having rectilinear portions and longitudinally curved portions extending from said rectilinear portions, said cover member being slidably engageable within the affixed tunnel member to be held vertically within the tunnel member under the stress of the cable, said tunnel member and cover member including complementary means which are removably and slidably interengaged when the cover member is slidably engaged in the tunnel member to secure the cover member longitudinally in the tunnel member removably without the use of fastener means between the cover member and tunnel member, said cable extending within said cover member which in turn extends within the tunnel member such that the cable is confined within the tunnel member, said cover member having a lower longitudinal edge, said opening for the cable being constituted by a groove provided in said lower longitudinal edge extending along the entire length of the cover member, said complementary means including at least one projection means on the cover member engageable with the tunnel member, said tunnel member having a slot for receiving said projection means, said slot extending along a portion of the tunnel member and being formed by a cut-out therein, said cut-out and projection means extending along substantially rectilinear portions respectively in said tunnel member and said cover member, said cover member being constituted by a synthetic resin material which has high resistance to abrasion, and being sufficiently elastic to be elastically deformed when introduced and engaged in said tunnel member.

2. Apparatus as claimed in claim 1 wherein said resin material is an acetyl resin.

3. Apparatus as claimed in claim 1 wherein said complementary means further comprises bosses on one of said members and perforations on the other member positioned to receive said bosses when the cover member is engaged in the tunnel member.

4. Apparatus as claimed in claim 3 wherein said cover member is resilient and includes opposed arms, said tunnel member including flanges slidably receiving said arms, said bosses and perforations being provided in said arms and flanges.

* * * * *